(12) United States Patent
Livshiz et al.

(10) Patent No.: US 6,405,587 B1
(45) Date of Patent: Jun. 18, 2002

(54) SYSTEM AND METHOD OF CONTROLLING THE COASTDOWN OF A VEHICLE

(75) Inventors: Michael Livshiz, Ann Arbor; Scott J. Chynoweth, Fenton; Rodney J. Rhodes, Pinckney, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/566,879

(22) Filed: May 8, 2000

(51) Int. Cl.[7] .............................................. G01M 15/00
(52) U.S. Cl. ..................................................... 73/117.3
(58) Field of Search ............................. 72/116, 117.2, 72/117.3; 123/339.2, 339.11, 357

(56) References Cited

U.S. PATENT DOCUMENTS

| | | | | |
|---|---|---|---|---|
| 4,493,303 A | * | 1/1985 | Thompson et al. | ......... 123/357 |
| 5,463,993 A | * | 11/1995 | Livshits et al. | ......... 123/339.2 |
| 5,638,788 A | * | 6/1997 | Sanvido et al. | ......... 123/339.2 |
| 6,269,293 B1 | * | 7/2001 | Correa et al. | ................. 701/51 |

* cited by examiner

*Primary Examiner*—Benjamin R. Fuller
*Assistant Examiner*—Maurice Stevens
(74) *Attorney, Agent, or Firm*—Anthony Luke Simon

(57) ABSTRACT

A method of controlling the coastdown of a vehicle is provided. A base engine speed reference is determined. A speed of the vehicle is sensed, and a target engine speed is generated from the base engine speed reference and the speed of the vehicle. An actual engine speed is sensed, and a desired throttle position is determined as a difference between the target engine speed and the actual engine speed. A desired spark advance for the engine is determined as a difference between the target engine speed and actual engine speed.

27 Claims, 2 Drawing Sheets

SYSTEM AND METHOD OF CONTROLLING THE COASTDOWN OF A VEHICLE

FIELD OF THE INVENTION

This invention relates generally to the field of automobiles, and in particular, to a system and method of controlling the coastdown of an automobile.

BACKGROUND OF THE INVENTION

Conventional automobiles typically include speed control software that controls the speed of the engine under various driving conditions. This software may consist of a number of operating modes. For example, such software may include a "coastdown" control mode that controls the rate of deceleration of the vehicle, which prevents engine stalls in low speed driving scenarios such as those encountered in parking lots and improves the driveability of the vehicle. Typically, the coastdown control mode is active when the throttle is closed and the vehicle is moving. The speed control software may also include an idle speed control mode that controls the speed of the engine under idle conditions. In operation, the speed control software transitions from the coastdown control mode (while the vehicle is decelerating) to the idle speed control mode (after the speed of the vehicle drops below a predetermined vehicle speed calibration).

Conventional coastdown control systems typically employ a mass airflow MAF-based methodology for the coastdown control mode. The MAF-based methodology is generally a closed loop control algorithm based on a desired engine mass airflow. However, it does not have MPH feedback to control the deceleration rate directly, and it does not have engine speed (i.e. RPM) feedback to control engine speed sags or droops, which may lead to engine stalls.

There are many other disadvantages to these conventional coastdown control systems. For example, there are typically many variables that must be considered in determining the desired MAF. In particular, there are many open loop terms that are required to determine the desired MAF in order to take into account the various engine load and operational conditions. This in turn results in the need for a significant amount of software and memory (i.e. RAM and ROM) to implement this control strategy, which increases the cost of the overall control system considerably. Moreover, a tremendous amount of time is required to calibrate the large number of variables that must be taken into account. This also adds considerable cost to the control system. Finally, the transition between the coastdown mode and the idle speed control mode is very complex because the coastdown mode is typically MAF based while the idle speed control is typically engine speed (RPM) based. Any discontinuities between these modes can lead to engine stalls. This problem is compounded if any loads to the engine are applied simultaneously.

Accordingly, it would be desirable to have a system and method of controlling the coastdown of a vehicle that overcomes the disadvantages described above.

SUMMARY OF THE INVENTION

One aspect of the invention provides a method of controlling the coastdown of a vehicle. A base engine speed reference is determined. A speed of the vehicle is sensed, and a target engine speed is generated from the base engine speed reference and the speed of the vehicle. An actual engine speed is sensed. A desired throttle position is determined by a speed controller based on a difference between the target engine speed and the actual engine speed. A desired spark advance is determined for the engine by the speed controller based on the difference between the target engine speed and actual engine speed. A gear shift of a transmission may preferably be sensed, and the desired throttle position may preferably be adjusted in response to the gear shift. A turbine speed of a transmission may also be sensed, and the target engine speed may be generated from the base engine speed reference, the speed of the vehicle, and the turbine speed. A gear of the transmission may also be sensed. The target engine speed may preferably be generated from the base engine speed reference, the speed of the vehicle, the turbine speed of the transmission, and the gear. A coolant temperature may preferably be sensed, and the base engine speed reference may be determined from the coolant temperature. The ambient air pressure may also be sensed, and the base engine speed reference may be determined from the ambient air pressure. Whether a desired deceleration rate is occurring based on the speed of the vehicle may be determined. An offset may preferably be generated if the desired deceleration rate is not occurring. The offset may preferably be applied to the target engine speed to achieve the desired deceleration rate. A coastdown turbine speed reference may preferably be generated as a difference between the turbine speed and a calibrated coastdown turbine speed reference. The coast down turbine speed reference may preferably be applied to the target engine speed to minimize a bump felt through the drivetrain and vehicle chassis.

Another aspect of the invention provides a method of controlling the coastdown of a vehicle. A transmission including a plurality of gears is provided. The transmission is operatively coupled to the engine, and a driveline is operatively coupled to the transmission. A throttle is in communication with the engine to regulate the amount of airflow to the engine. A base engine speed reference is determined. A speed of the vehicle is sensed from the driveline, and a turbine speed and a gear are both sensed from the transmission. A target engine speed is generated from the base engine speed reference, the turbine speed, the gear, and the speed of the vehicle. An actual engine speed is sensed, and a desired throttle position is determined by a speed controller based on a difference between the target engine speed and the actual engine speed. A desired spark advance for the engine is determined by the speed controller based on the difference between the target engine speed and actual engine speed. A gear shift from the transmission is sensed, and the desired throttle position is adjusted in response to the gear shift.

Another aspect of the invention provides a system for controlling the coastdown of a vehicle including a basic reference calculator that determines a base engine speed reference. Means for sensing a speed of the vehicle is provided. A reference trajectory generator is also provided that generates a target engine speed from the base engine speed reference and the speed of the vehicle. Means for sensing an actual engine speed is provided. A speed controller determines a desired throttle position based on a difference between the target engine speed and the actual engine speed and a desired spark advance for the engine based on the difference between the target engine speed and actual engine speed. A means for sensing a gear shift of a transmission may also be provided. A downshift feedforward controller adjusts the desired throttle position in response to the gear shift. A means for sensing a turbine speed of a transmission may also be provided so that the reference trajectory generator generates the target engine speed from the base engine speed reference, the speed of the vehicle, and the turbine speed. A gear of the transmission may be sensed so that the reference trajectory generator generates the target engine speed from the base engine speed reference, the speed of the vehicle, the turbine speed of the transmission, and the gear. A means for sensing a coolant temperature may preferably be provided wherein the basic reference calculator determines the base engine speed reference from the coolant temperature. A means for sensing ambient air pressure may also be provided wherein the basic reference calculator determines the base engine speed reference from the ambient air pressure.

Another aspect of the invention provides a program for controlling the coastdown of a vehicle. Computer readable program code determines a base engine speed reference and senses a speed of the vehicle. Computer readable program code generates a target engine speed from the base engine speed reference and the speed of the vehicle. Computer readable program code senses an actual engine speed and determines a desired throttle position based on a difference between the target engine speed and the actual engine speed. Computer readable program code determines a desired spark advance for the engine based on the difference between the target engine speed and actual engine speed. Computer readable program code may preferably sense a gear shift of a transmission and may adjust the desired throttle position in response to the gear shift. Computer readable program code may also preferably sense a turbine speed of a transmission, and generate the target engine speed from the base engine speed reference, the speed of the vehicle, and the turbine speed. Computer readable program code may preferably sense a gear of the transmission, and may preferably generate the target engine speed from the base engine speed reference, the speed of the vehicle, the turbine speed of the transmission, and the gear. Computer readable program code may preferably sense a coolant temperature, and may preferably determine the base engine speed reference from the coolant temperature. Computer readable program code may preferably sense ambient air pressure, and may preferably determine the base engine speed reference from the ambient air pressure.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
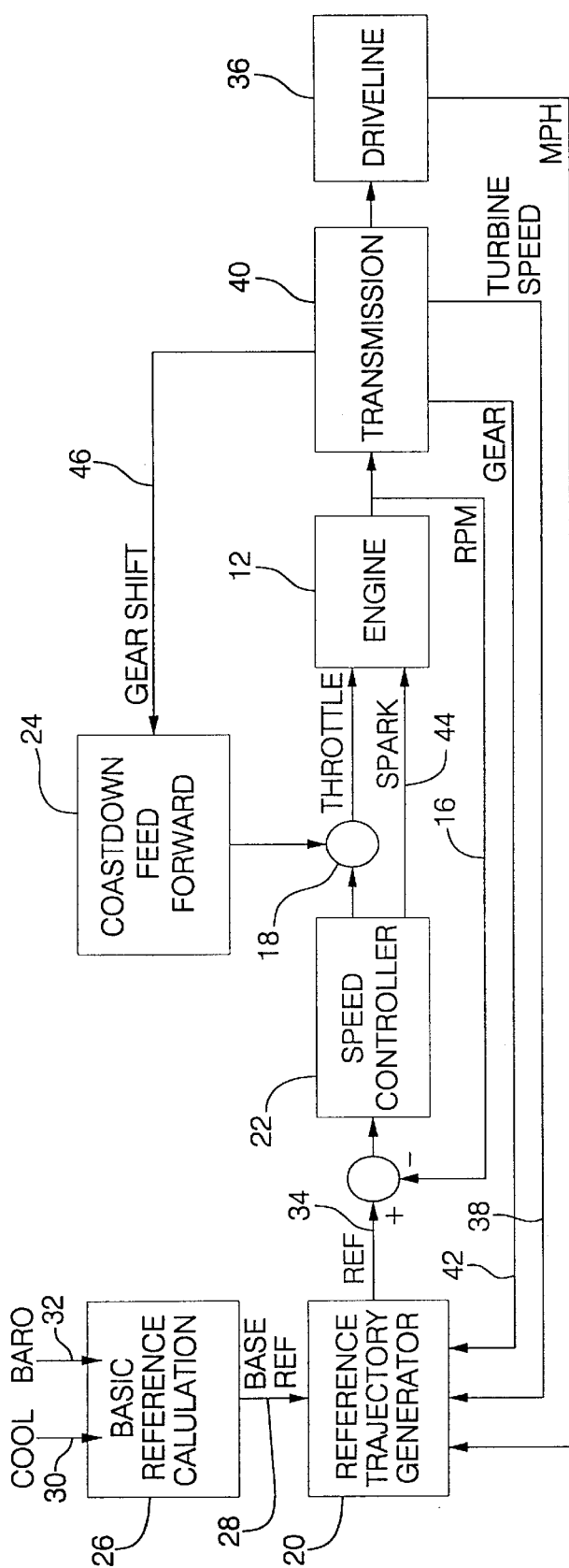
FIG. 1 is a schematic block diagram of a preferred embodiment of a system for controlling the coastdown of a vehicle that is made in accordance with the invention.

FIG. 1 is a schematic block diagram that illustrates an embodiment of a system 10 for controlling the coastdown of a vehicle. The system 10 may be implemented in any conventional vehicle having an internal combustion engine 12. As shown in FIG. 1, the system 10 utilizes the actual speed of the vehicle (in MPH) 14 as feedback to control the vehicle deceleration rate directly. The system 10 also utilizes the actual speed of the engine (in RPM) 16 as feedback to control the speed of the engine 12 directly to prevent speed sags or droops. As discussed in greater detail below, the system 10 utilizes an internal loop that is used to control engine speed directly, avoid engine stalls, and to enable a smooth transition to idle under heavy deceleration conditions. The system 10 also utilizes an external loop that is used to control the deceleration rate when the throttle 18 (or idle air actuator) is closed, and to avoid bumps (or vibrations) that are transmitted through the powertrain when there are transitions between open throttle and closed throttle.

Referring again to FIG. 1, the system 10 includes a reference trajectory generator 20, a speed controller 22, and a downshift feedforward controller 24 (or coastdown feedforward controller). A basic reference calculator represented by block 26 determines a base engine speed reference 28. The base engine speed reference 28 (measured in RPM) is the engine speed that is required for an idle speed mode based on various operational and environmental conditions. These conditions include, for example, the engine coolant temperature 30, the ambient air pressure 32, and various other offsets to engine speed to take into account loads and vehicle vibration considerations. The base engine speed reference 28 may preferably be calculated by any conventional method as is generally known in the art of engine speed control. As shown in FIG. 1, the base engine speed reference 28 is supplied to the reference trajectory generator 20.

As shown in FIG. 1, the reference trajectory reference generator 20 produces a reference or "target" engine speed 34. The reference or target engine speed 34 is based on the base engine speed reference 28, the measured speed (MPH) 14 of the vehicle as measured from the driveline 36, the measured turbine speed 38 of the transmission 40 (for an automatic transmission), and the selected gear 42 of the transmission 40. The function of the reference trajectory generator 20 is to create a smooth transition from a high vehicle speed down to a low vehicle speed when the throttle 18 is closed. As explained in greater detail below, the reference trajectory generator 20 commands an engine speed trajectory to control the rate of deceleration, to prevent engine stall, and to reduce bumps (or vibrations) that are transmitted through the powertrain (i.e. engine, transmission, drive shafts, etc.).

The speed controller 22 determines a desired throttle position for the throttle 18 (or idle air actuator) to regulate the amount of airflow to the engine 12. The desired throttle position is based on the difference between the reference or target engine speed 34 from the reference trajectory generator 20 and the actual measured engine speed (RPM) 16. Adjusting the position of the throttle 18 in turn adjusts the amount of airflow to the engine 12. This may be accomplished by any conventional means. The speed controller 22 also determines a desired amount of spark advance 44 to the engine 12 based on the difference between the reference or target engine speed 34 and the measured engine speed 16. The speed controller 22 may preferably be based on a conventional steady state torque estimator that is used to determine the amount of airflow required to achieve the reference or target engine speed 34. A preferred embodiment of a speed controller 22 is disclosed in U.S. Pat. No. 5,463,993, which is hereby incorporated by reference.

The downshift feedforward controller 24 generates an additional change in the position of the throttle 18 (or idle air actuator) in response to loads created due to gear shifts 46 in the transmission 40. That is, when a transmission downshift is requested, the downshift feedforward controller 24 may change the position of the throttle 18 to smooth out the change in engine RPM. In particular, airflow to the engine 12 "leads" the application of the load change on the engine 12 as a result of the transmission shift 46 and prepares the engine control system of the vehicle so that spark activity can compensate for any additional torque changes. For example, if a downshift occurs, a calibrated amount of airflow is added to the engine 12 for a calibrated amount of time. When this time period expires, this airflow is ramped back out of the engine 12 at a calibrated rate.

Referring again to FIG. 1, the reference trajectory generator 20 determines the proper reference or target engine speed 34 to be supplied to the speed controller 22 to enable the system 10 to prevent engine stalls, control the rate of deceleration, and reduce bumps or vibrations in the drivetrain. In the preferred embodiment, the control of the deceleration rate and the reduction of bumps in the drivetrain may only apply for vehicle speeds in excess of approximately 15 MPH. Below this speed, there may be insufficient airflow to control these factors. In any event, the deceleration rate and the bumps in the drivetrain may not be significant factors that need to be compensated for by the system 10 when the vehicle is traveling at these low speeds. The system's prevention of engine stall, on the other hand, is carried out regardless of the speed of the vehicle. In the embodiment shown, the speed controller 22, which takes in account the actual engine speed 16 (as feedback) and the reference or target engine speed 34 from the reference trajectory generator 20, is primarily responsible for carrying out the stall prevention function of the present invention.

Figure 2:
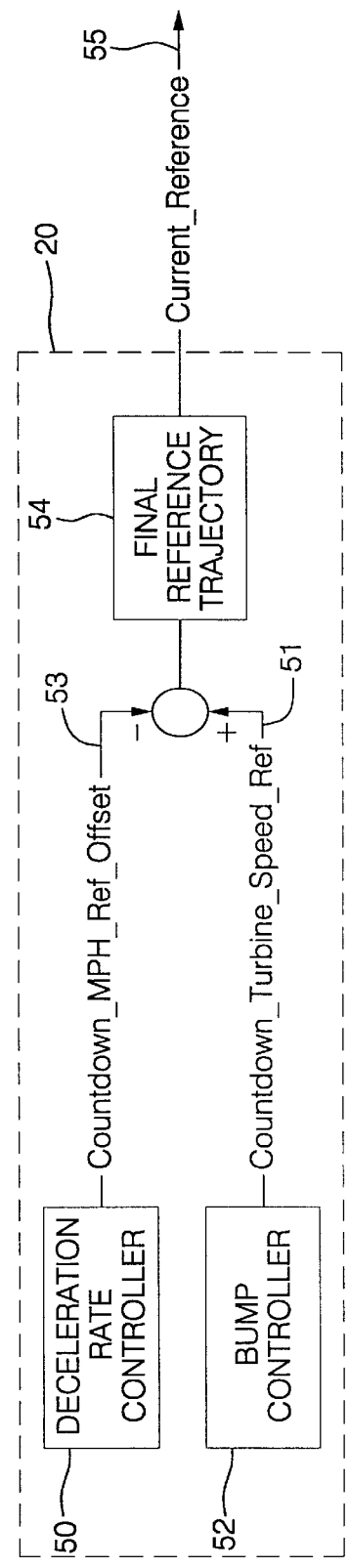
FIG. 2 is a schematic block diagram of a preferred embodiment of the reference trajectory generator shown in FIG. 1.

FIG. 2 is a more detailed schematic block diagram of a preferred embodiment of the reference trajectory generator 20 shown in FIG. 1. As shown in FIG. 2, the reference trajectory generator 20 includes a deceleration rate controller 50, a bump controller 52, and a final reference trajectory controller 54. The deceleration rate controller 50 determines the component of the reference trajectory that is used to control the vehicle deceleration rate. The deceleration rate controller 50 uses direct vehicle speed feedback to determine if the desired deceleration rate is occurring. If the desired deceleration rate is not occurring, the deceleration rate controller 50 adjusts this component of the trajectory by generating an offset in order to achieve the desired deceleration rate. The output of the deceleration rate controller 50 is expressed in FIG. 2 as Coastdown_MPH_Ref_Offset (see line 53).

Figure 3:
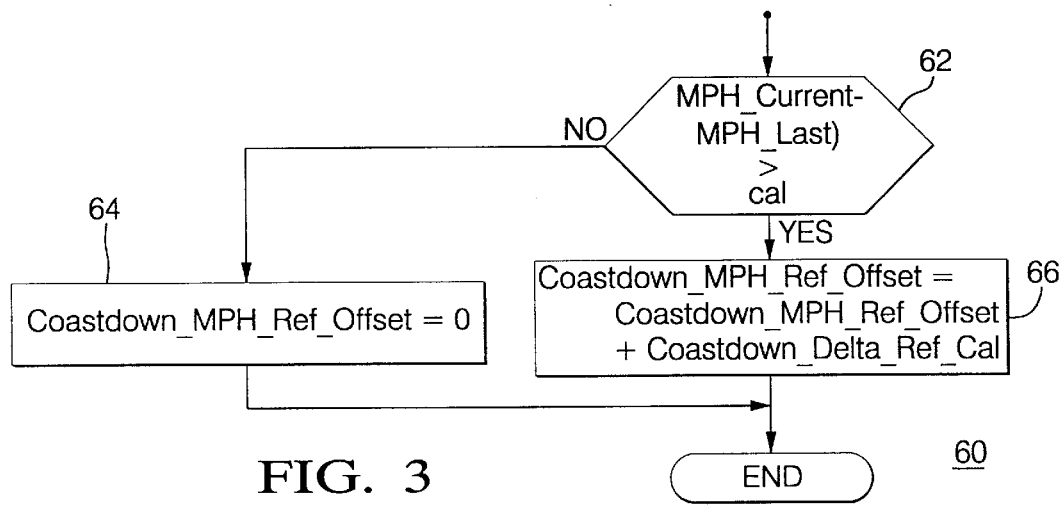
FIG. 3 is a flow chart of an embodiment of a routine for the deceleration rate controller shown in FIG. 2 that is made in accordance with the invention.

FIG. 3 is a flow chart of an embodiment of a routine 60 for the deceleration rate controller 50 shown in FIG. 2. As shown in block 62 of FIG. 3, the routine 60 determines if the difference between the current measured speed of the vehicle (MPH Current) and the last measured speed of the vehicle (MPH Last) is greater than some calibrated threshold value (Cal). If the difference between the current measured speed of the vehicle and last measured speed of the vehicle is not greater than the calibrated threshold value, then no coastdown vehicle speed modification or offset is required as shown in block 64. If the difference between the current measured speed of the vehicle and the last measured speed of the vehicle is greater than the calibrated threshold value, than the desired deceleration rate is not occurring, and an offset (Coastdown_MPH_Ref_Offset) is generated as shown in block 66 to achieve the desired deceleration rate.

As shown in block 66, the following equation may preferably be used to calculate this offset:

$$\text{Coastdown\_MPH\_Ref\_Offset} = \text{Coastdown\_MPH\_Ref\_Offset} + \text{Coastdown\_Delta\_Ref\_Cal}.$$

Referring again to FIG. 2, the bump controller 52 reduces bumps that are transmitted through the powertrain (i.e. engine, transmission, drive shafts, etc.). A "bump" merely refers to vibrations or shock waves transmitted throughout the powertrain (engine, transmission, drive shafts, etc.) that are due to impulse torques imparted to the vehicle. For example, a "bump" may be generated as a result of the engagement of an air conditioner compressor. A driver may feel the "bump" when the engine reacts to this torque and applies a torque to the engine mounts, thus transmitting the "bump" to the chassis. Controlling the engine speed as a function of the transmission speed and a small offset (that is empirically determined) minimizes the amount of transmitted bump. The bump controller 52 therefore generates a coastdown turbine speed reference 51 (referred to as Coastdown_Turbine_Speed_Ref) to account for these bumps. The coastdown turbine speed reference 51 is generated by calculating the difference between the turbine speed 38 of the transmission 40 (see FIG. 1) and a calibrated coastdown turbine speed reference offset, which is based on the transmission gear 42 and vehicle speed 14 (see FIG. 1). The following equation may preferably be used to calculate the coastdown turbine speed reference 51:

$$\text{Coastdown\_Turbine\_Speed\_Ref} = \text{Turbine\_Speed} - \text{Coastdown\_Turbine\_Speed\_Ref\_Offset\_Cal (Gear, MPH)}.$$

The coastdown turbine speed reference 51 may preferably be limited to a maximum value to limit the amount of change in this parameter. Moreover, because the turbine speed of a manual transmission is zero, the bump controller 52 may preferably provide bump suppression in vehicles having automatic transmissions.

Referring again to FIG. 2, the final reference trajectory controller 54 determines a current reference engine speed 55, which is the same as the reference or target engine speed 34 shown in FIG. 1. There are two operational scenarios for determining the current reference speed 55. The first situation arises when the engine speed 16 is greater than the turbine speed 38. In this scenario, the engine 12 drives the vehicle. The second situation arises when the engine speed 16 is lower than the turbine speed 38. Under this scenario, the vehicle inertia drives the engine 12.

Figure 4:
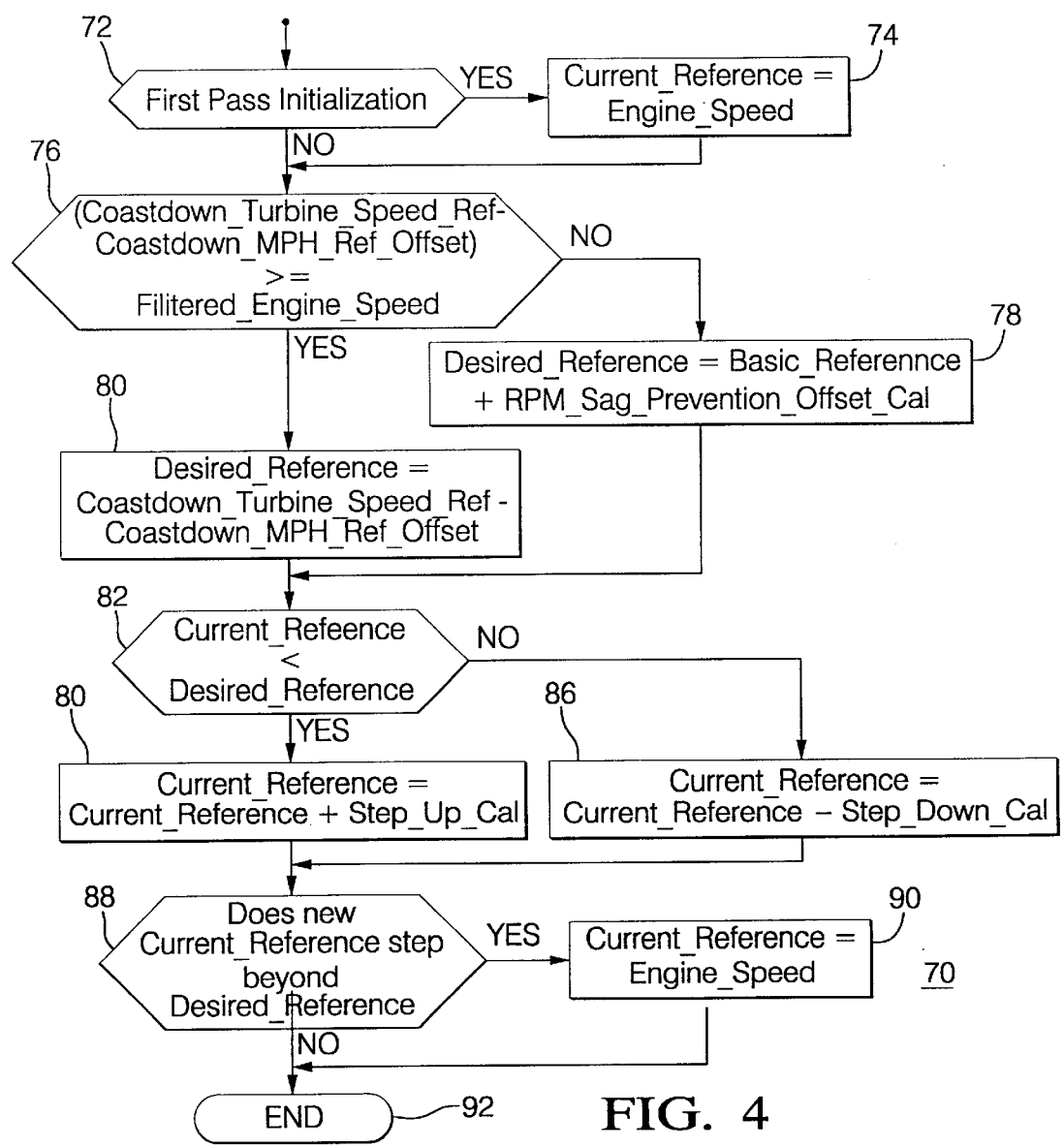
FIG. 4 is a flow chart of an embodiment of a routine for the final reference trajectory controller shown in FIG. 2 that is made in accordance with the invention.

FIG. 4 is a flow chart of an embodiment of a routine 70 for the final reference trajectory controller 54 shown in FIG. 2. Referring to FIGS. 2 and 4, with a first pass initialization, the routine 70 sets the current reference engine speed 55 at a value equal to the actual measured engine speed 16 (see Blocks 72 and 74). The routine 70 then determines whether the difference between the Coastdown_Turbine_Speed_Ref 51 and the Coastdown_MPH_Ref_Offset 53 is greater than or equal to the engine speed 16 (see Block 76). Referring to Blocks 76 and 78, if the difference between the Coastdown_Turbine_Speed_Ref 51 and the Coastdown_MPH_Ref_Offset 53 is not greater than or equal to the engine speed 16, then a desired reference engine speed is determined which equals the base engine speed reference 28 (see FIG. 1) plus an offset (referred to as RPM_Sag_Prevention_Offset_Cal) to prevent engine speed sag. Referring to Blocks 76 and 80, if the difference between the Coastdown_Turbine_Speed_Ref 51 and the Coastdown_MPH_Ref_Offset 53 is greater than or equal to the engine speed 16, then a desired reference engine speed is determined which equals the difference between the Coastdown_Turbine_Speed_Ref 51 and the Coastdown_MPH_Ref_Offset 51. As shown in Blocks 82 and 84, if the current reference engine speed 55 is less than the desired reference engine speed, the current reference engine speed 55 is increased towards the desired reference engine speed. As shown in Blocks 82 and 86, if the current reference engine speed 55 is not less than the desired reference engine speed, the current reference engine speed 55 is decreased towards the desired reference engine speed.

The routine 70 then determines if the new current reference engine speed steps beyond the desired reference engine speed as shown in block 88. If the new current reference engine speed does step beyond the desired reference engine speed, the current reference engine speed 55 is set to the desired reference engine speed as shown in block 90. If the new current reference does not step beyond the desired reference, the routine 70 ends as shown in block 92.

The use of the measured vehicle speed 14 and the measured engine speed 16 as feedback in the system 10 described above provides many performance improvements. For example, the system 10 allows the engine speed to be controlled directly via the measured engine speed feedback. The system 10 therefore reacts to engine speed droops or sags quickly, which results in improved stall prevention. Also, the RPM feedback results in an improved launch sequence for vehicles having a manual transmission. That is, the vehicle can be launched without the driver having to depress the accelerator pedal. Moreover, the system 10 utilizes direct vehicle speed input for controlling the vehicle speed to the desired trajectory. In particular, the deceleration rate of the vehicle is based on the measured speed 14 of the vehicle, which provides a smooth transition from a high engine speed to idle speed. The system 10 also reduces bumps that are transmitted through the powertrain based on the empirically determined offset from the transmission turbine speed 38.

In addition to the advantages described above, the system 10 also provides in increased cost savings due to the elimination of the significant amount of software that is typically required with conventional control systems that employ, for example, MAF-based methodology. The reduction in software in turn results in a reduction the amount of RAM and ROM required, which also reduces costs significantly. The system 10 eliminates the large number of variables associated with conventional control system, which in reduces the calibration time of the system 10.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of controlling the coastdown of a vehicle comprising the steps of:
   determining a base engine speed reference;
   sensing a speed of the vehicle;
   generating a target engine speed from the base engine speed reference and the speed of the vehicle;
   sensing an actual engine speed;
   determining a desired throttle position based on a difference between the target engine speed and the actual engine speed; and
   determining a desired spark advance for the engine based on the difference between the target engine speed and actual engine speed.

2. The method of claim 1 further comprising the steps of:
   sensing a gear shift of a transmission; and
   adjusting the desired throttle position in response to the gear shift.

3. The method of claim 1 further comprising the steps of:
   sensing a turbine speed of a transmission; and
   generating the target engine speed from the base engine speed reference, the speed of the vehicle, and the turbine speed.

4. The method of claim 3 further comprising the steps of;
   sensing a gear of the transmission; and
   generating the target engine speed from the base engine speed reference, the speed of the vehicle, the turbine speed of the transmission, and the gear.

5. The method of claim 1 further comprising the steps of:
   sensing a coolant temperature; and
   determining the base engine speed reference from the coolant temperature.

6. The method of claim 1 further comprising the steps of:
   sensing ambient air pressure; and
   determining the base engine speed reference from the ambient air pressure.

7. The method of claim 1 further comprising the steps of:
   determining if a desired deceleration rate is occurring based on the speed of the vehicle;
   generating an offset if the desired deceleration rate is not occurring; and
   applying the offset to the target engine speed to achieve the desired deceleration rate.

8. The method of claim 3 further comprising the steps of:
   generating a coastdown turbine speed reference as a difference between the turbine speed and a calibrated coastdown turbine speed reference; and
   applying the coast down turbine speed reference to the target engine speed to minimize a bump.

9. A method of controlling the coastdown of a vehicle comprising the steps of:
   providing a transmission including a plurality of gears, the transmission operatively coupled to the engine, a driveline operatively coupled to the transmission, a throttle in communication with the engine to regulate the amount of airflow to the engine;
   determining a base engine speed reference;
   sensing a speed of the vehicle from the driveline;
   sensing a turbine speed and a gear from the transmission;
   generating a target engine speed from the base engine speed reference, the turbine speed, the gear, and the speed of the vehicle;
   sensing an actual engine speed;
   determining a desired throttle position based on a difference between the target engine speed and the actual engine speed;
   determining a desired spark advance for the engine based on the difference between the target engine speed and actual engine speed;
   sensing a gear shift from the transmission; and
   adjusting the desired throttle position in response to the gear shift.

10. A system for controlling the coastdown of a vehicle comprising:
    a basic reference calculator for determining a base engine speed reference;

means for sensing a speed of the vehicle;

a reference trajectory generator for generating a target engine speed from the base engine speed reference and the speed of the vehicle;

means for sensing an actual engine speed; and a speed controller for determining a desired throttle position based on a difference between the target engine speed and the actual engine speed and a desired spark advance for the engine based on the difference between the target engine speed and actual engine speed.

11. The system of claim 10 further comprising:

means for sensing a gear shift of a transmission; and a downshift feedforward controller for adjusting the desired throttle position in response to the gear shift.

12. The system of claim 10 further comprising:

means for sensing a turbine speed of a transmission wherein the reference trajectory generator generates the target engine speed from the base engine speed reference, the speed of the vehicle, and the turbine speed.

13. The system of claim 12 further comprising:

means for sensing a gear of the transmission wherein the reference trajectory generator generates the target engine speed from the base engine speed reference, the speed of the vehicle, the turbine speed of the transmission, and the gear.

14. The system of claim 10 further comprising:

means for sensing a coolant temperature wherein the basic reference calculator determines the base engine speed reference from the coolant temperature.

15. The system of claim 10 further comprising:

means for sensing ambient air pressure wherein the basic reference calculator determines the base engine speed reference from the ambient air pressure.

16. A program for controlling the coastdown of a vehicle comprising:

computer readable program code that determines a base engine speed reference;

computer readable program code that senses a speed of the vehicle;

computer readable program code that generates a target engine speed from the base engine speed reference and the speed of the vehicle;

computer readable program code that senses an actual engine speed;

computer readable program code that determines a desired throttle position based on a difference between the target engine speed and the actual engine speed; and computer readable program code that determines a desired spark advance for the engine based on the difference between the target engine speed and actual engine speed.

17. The program of claim 16 further comprising:

computer readable program code that senses a gear shift of a transmission; and computer readable program code that adjusts the desired throttle position in response to the gear shift.

18. The program of claim 16 further comprising:

computer readable program code that senses a turbine speed of a transmission; and computer readable program code that generates the target engine speed from the base engine speed reference, the speed of the vehicle, and the turbine speed.

19. The program of claim 18 further comprising:

computer readable program code senses a gear of the transmission; and computer readable program code that generates the target engine speed from the base engine speed reference, the speed of the vehicle, the turbine speed of the transmission, and the gear.

20. The program of claim 16 further comprising:

computer readable program code that senses a coolant temperature; and computer readable program code that determines the base engine speed reference from the coolant temperature.

21. The method of claim 16 further comprising:

computer readable program code that senses ambient air pressure; and computer readable program code that determines the base engine speed reference from the ambient air pressure.

22. A system for controlling the coastdown of a vehicle, said system comprising:

a basic reference calculator operable to determine a base engine speed reference;

a reference trajectory generator operable to generate a target engine speed as a function of the base engine speed reference and a vehicle speed associated with the vehicle; and a speed controller operable to determine a desired throttle position based on a difference between the target engine speed and an engine speed associated with the vehicle, said speed controller further operable to determine a desired spark advance as a function of the target engine speed and the engine speed.

23. The system of claim 22, further comprising:

a downshift feedforward controller operable to adjust the desired throttle position as a function of a gear shift associated with the vehicle.

24. The system of claim 22, wherein:

said reference trajectory generator is operable to generate the target engine speed as a function of the base engine speed reference, the vehicle speed, and a turbine speed associated with the vehicle.

25. The system of claim 22, wherein:

said reference trajectory generator is operable to generate the target engine speed as a function of the base engine speed reference, the vehicle speed, a turbine speed associated with the vehicle, and a gear position associated with the vehicle.

26. The system of claim 22, wherein:

said basic reference calculator is operable to determine the base engine speed reference as a function of a coolant temperature associated with the vehicle.

27. The system of claim 22, wherein:

said basic reference calculator is operable to determine the base engine speed reference as a function of ambient air pressure associated with the vehicle.

* * * * *